(12) United States Patent
Kaserer et al.

(10) Patent No.: US 11,976,727 B2
(45) Date of Patent: May 7, 2024

(54) FASTENING OF A COVER TO A HOUSING

(71) Applicant: Robert Bosch GmbH, Stuttgart (DE)

(72) Inventors: Stefan Kaserer, Ofterschwang (DE); Andreas Weh, Sulzberg (DE); Martin Hagspiel, Rettenberg (DE); Florian Breyer, Oberstaufen (DE); Tobias Franke, Missen (DE)

(73) Assignee: Robert Bosch GmbH, Stuttgart (DE)

( * ) Notice: Subject to any disclaimer, the term of this patent is extended or adjusted under 35 U.S.C. 154(b) by 554 days.

(21) Appl. No.: 17/252,444

(22) PCT Filed: Mar. 7, 2019

(86) PCT No.: PCT/EP2019/055692
§ 371 (c)(1),
(2) Date: Dec. 15, 2020

(87) PCT Pub. No.: WO2020/011405
PCT Pub. Date: Jan. 16, 2020

(65) Prior Publication Data
US 2021/0254713 A1    Aug. 19, 2021

(30) Foreign Application Priority Data

Jul. 10, 2018 (DE) .......................... 102018211436.6

(51) Int. Cl.
*F16J 13/14* (2006.01)
*F16L 55/115* (2006.01)
(Continued)

(52) U.S. Cl.
CPC ............. *F16J 13/14* (2013.01); *F16L 55/115* (2013.01); *B60T 8/409* (2013.01); *B60T 17/00* (2013.01)

(58) Field of Classification Search
CPC ...... F16B 7/0413; F16B 21/125; F16B 21/18; F16B 21/183; F16B 21/186; F16J 13/00;
(Continued)

(56) References Cited

U.S. PATENT DOCUMENTS 2,615,735 A * 10/1952 Heimann ................ F16B 21/18
411/517
3,429,476 A    2/1969 Hunter
(Continued)

FOREIGN PATENT DOCUMENTS

DE        946580 C      8/1956
DE        3333152 A1    3/1985
(Continued)

OTHER PUBLICATIONS

International Search Report for PCT/EP2019/055692, dated Jun. 11, 2019.

*Primary Examiner* — David R Deal
(74) *Attorney, Agent, or Firm* — NORTON ROSE FULBRIGHT US LLP; Gerard A. Messina

(57) ABSTRACT

A cup-shaped cover of a pedal travel simulator, hydraulic accumulator, or a damper chamber, using a radially resilient connecting ring, which protrudes into a groove of the cover and into an opposing groove of a receptacle of a hydraulic block of a traction slip controller of a hydraulic vehicle braking system, to fasten inseparably at the hydraulic block.

21 Claims, 3 Drawing Sheets

(51) Int. Cl.
*B60T 8/40* (2006.01)
*B60T 17/00* (2006.01)

(58) Field of Classification Search
CPC . F16J 13/10; F16J 13/14; F16L 37/088; F16L 55/136
USPC ....................................................... 285/321
See application file for complete search history.

(56) References Cited

U.S. PATENT DOCUMENTS

| | | | | |
|---|---|---|---|---|
| 3,479,068 | A * | 11/1969 | Brittain | F16D 65/46 285/321 |
| 3,643,551 | A * | 2/1972 | Berg | F15B 15/1438 92/128 |
| 3,650,182 | A * | 3/1972 | Phillips | F16J 10/02 403/375 |
| 4,186,946 | A * | 2/1980 | Snow | F16L 37/53 29/523 |
| 5,014,871 | A | 5/1991 | Mutter | |
| 5,727,821 | A * | 3/1998 | Miller | F16L 37/0887 285/308 |
| 6,139,119 | A * | 10/2000 | Otomo | B60T 8/3655 303/DIG. 11 |
| 6,263,779 | B1 * | 7/2001 | Oliver | F16F 9/3242 92/128 |
| 6,398,315 | B1 | 6/2002 | Dinkel et al. | |
| 2002/0122690 | A1 * | 9/2002 | Poon | F16B 21/18 403/326 |
| 2011/0030553 | A1 * | 2/2011 | Beumer | F15B 15/1438 92/169.1 |
| 2014/0327240 | A1 * | 11/2014 | Altenrath | F16L 37/088 285/321 |
| 2016/0031424 | A1 * | 2/2016 | Weh | B60T 8/409 60/533 |
| 2016/0116075 | A1 * | 4/2016 | Pippel | F16B 21/12 251/366 |

FOREIGN PATENT DOCUMENTS

| | | |
|---|---|---|
| DE | 4311263 A1 | 10/1994 |
| DE | 4425082 A1 | 1/1996 |
| DE | 202012008998 U1 | 1/2014 |
| EP | 0133455 A2 | 2/1985 |
| JP | 2005510669 A | 4/2005 |
| SU | 1569478 A1 | 6/1990 |
| WO | 9812088 A1 | 3/1998 |
| WO | 2018121913 A1 | 7/2018 |

* cited by examiner

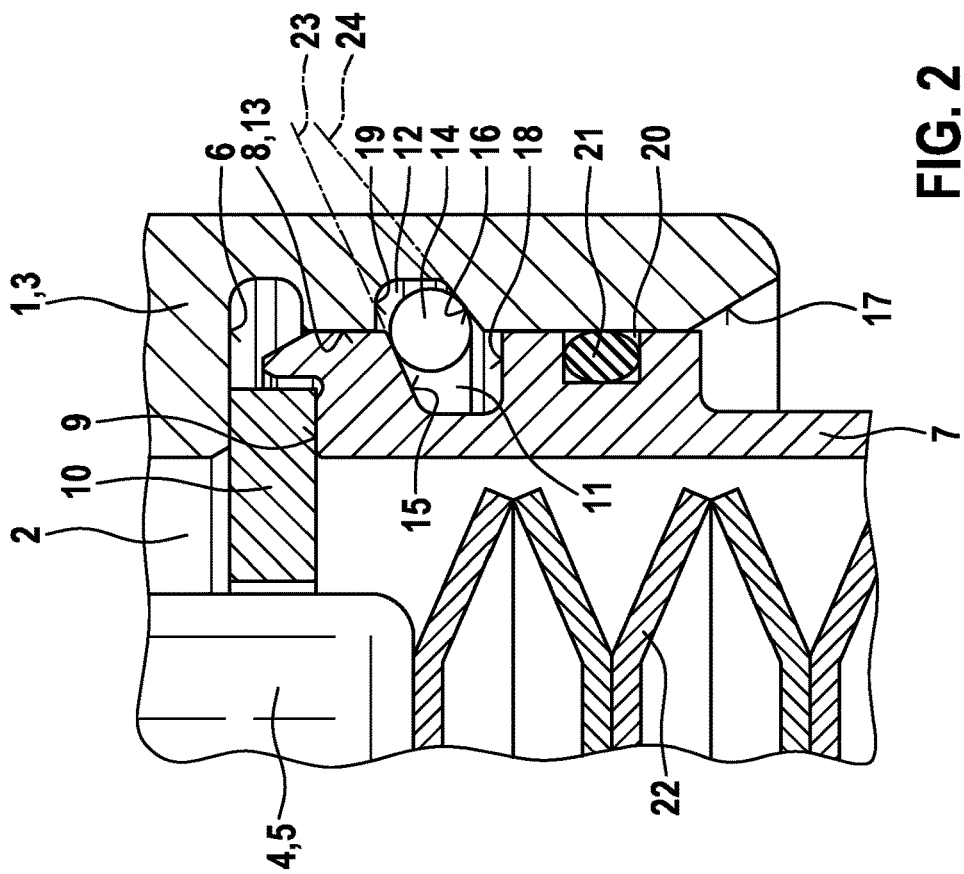
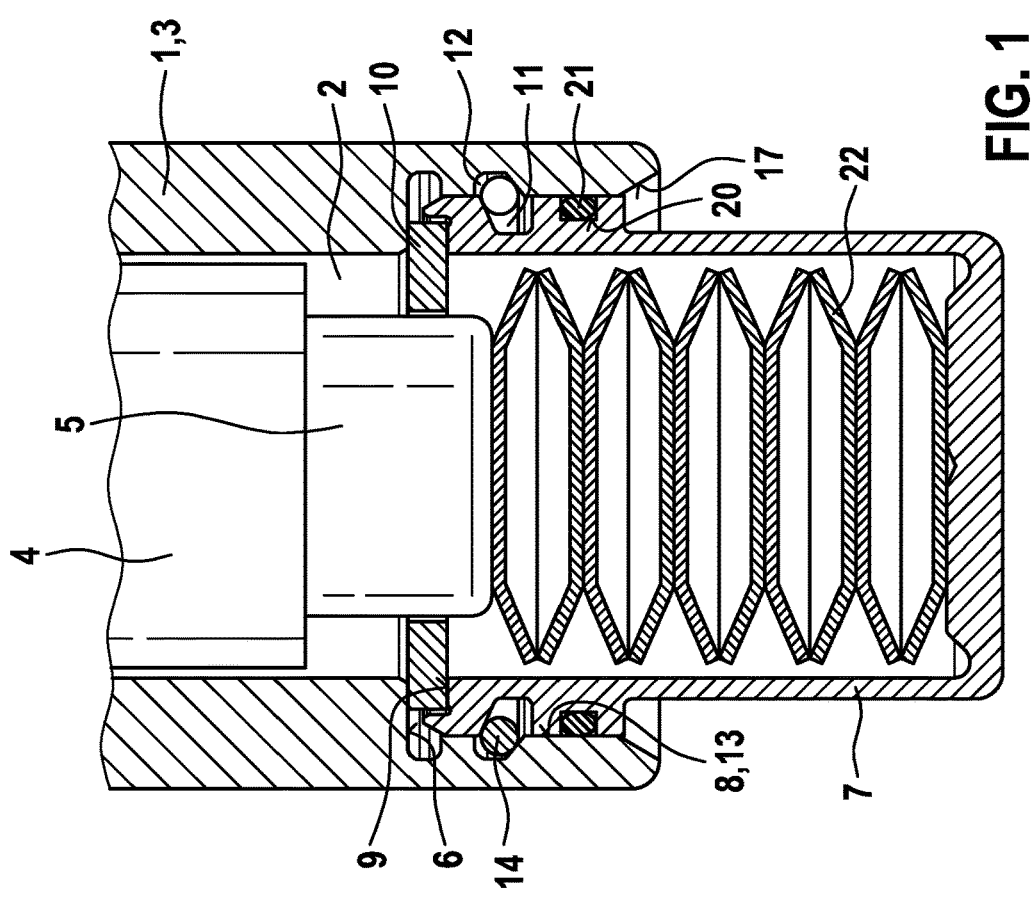

FASTENING OF A COVER TO A HOUSING

FIELD

The present invention relates to a fastening of a cover to a housing. The fastening may generally also be considered to be the connection of two components which jointly enclose a cavity when they are connected.

BACKGROUND INFORMATION

For example, conventional fastenings are available of cup-shaped covers which include a radial flange for their fastening on an end edge at an open end face of the cover, on which they are fastened using a threaded ring like a union nut or by caulking in a depression of a housing which forms a receptacle of the housing for the cover.

SUMMARY

The fastening according to an example embodiment of the present invention includes a cover and a housing, the housing including a depression as a receptacle for the cover, into which the cover is inserted completely or preferably somewhat in an insertion direction and from which the cover may protrude. The introduction of the cover into the receptacle of the housing may also be understood as plugging the cover into the receptacle of the housing. An inner circumferential wall of the receptacle of the housing for the cover extends in the insertion direction. In particular, the inner circumferential wall of the receptacle is cylindrical; however it may also have another round and/or polygonal cross section which is constant in shape and size over a depth of the receptacle.

The cover externally includes a circumferential groove and the receptacle internally includes a circumferential groove in its inner circumferential wall. The grooves are opposite to one another when the cover is fastened at the housing, the grooves being able to have some offset in the insertion direction. A connecting ring is situated in the grooves, which is resilient in the radial direction for the producibility of the fastening. The connecting ring engages both inwardly into the groove of the cover and outwardly into the groove in the inner circumferential wall of the receptacle of the housing for the cover and connects the cover to the housing by contact on groove flanks of the two grooves which are opposite to one another in the insertion direction.

The present invention is provided in particular for fastenings having a diameter of the receptacle of approximately 26 mm or more, because from approximately such a diameter, fastening and sealing by caulking at an orifice of the receptacle requires an excessively high forming force.

The present invention enables a fastening of the cover at the housing which is producible easily and quickly in that the cover is inserted into the receptacle of the housing. Moreover, the present invention enables a mechanically stable fastening of the cover on the housing which withstands the high separation forces oriented opposite to the insertion direction.

Refinements and advantageous embodiments of the present invention are described herein.

The present invention is provided in particular for a hydraulic block of a hydraulic assembly of a brake pressure controller of a hydraulic vehicle braking system. The cover is fastened there, for example, at a blind hole, which is used, for example, to accommodate a pedal travel simulator, a hydraulic accumulator, or a damper chamber. Such a hydraulic block is used for a mechanical fastening and hydraulic interconnection of components of the brake pressure controller such as solenoid valves, a pedal travel simulator, hydraulic accumulators, damper chambers, and further components. Interconnection means a hydraulic connection of the components corresponding to a hydraulic circuit diagram of the brake pressure controller. Equipped with components of the brake pressure controller, the hydraulic block forms the hydraulic assembly of the brake pressure controller. It is connected by brake lines to a brake master cylinder and hydraulic wheel brakes are also connected by brake lines to the hydraulic block or to the hydraulic assembly.

"Brake pressure controller" means, for example, a controller of a hydraulic brake pressure in the event of a power braking system and/or a traction slip controller. Traction slip controllers mean, for example, an antilock braking system, a traction control system, and a vehicle dynamics system, the latter also being referred to as an electronic stability program and colloquially often also as an anti-slip device. The abbreviations ABS, ASR, FDR, and ESP are conventional for these traction slip controllers. Such brake pressure controllers are conventional and are not explained further here.

All features described herein and shown in the figures may be implemented individually or in basically arbitrary combination in exemplary embodiments of the present invention. Embodiments of the present invention which do not include all, but only one or multiple features are basically possible.

BRIEF DESCRIPTION OF THE DRAWINGS

The present invention is explained in greater detail hereinafter on the basis of a specific embodiment shown in the figures.

FIG. 1 shows a fastening according to an example embodiment of the present invention in axial section.

FIG. 2 shows an enlarged view of the fastening in accordance with an example embodiment of the present invention.

DETAILED DESCRIPTION OF EXAMPLE EMBODIMENTS

Figure 3:
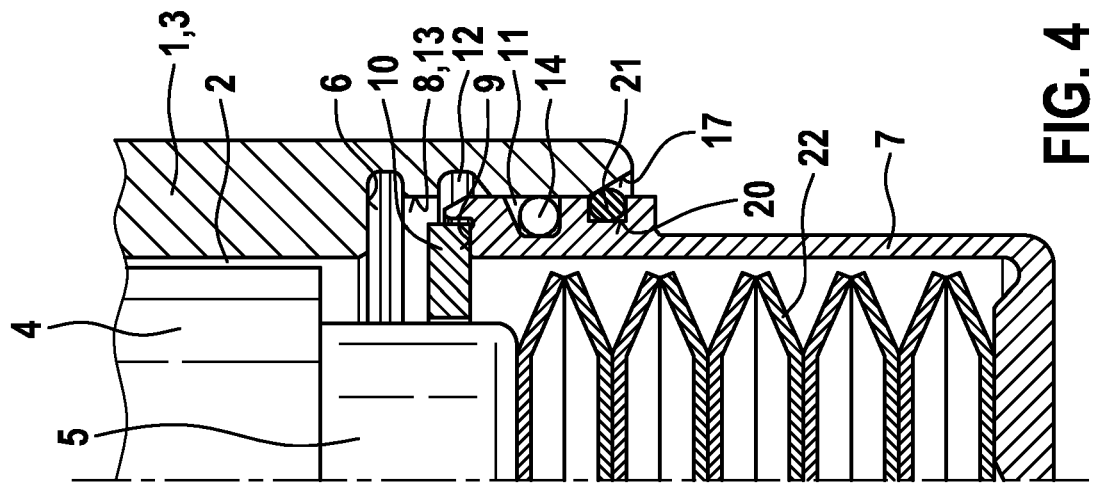
FIGS. 3 and 4 show two states during a production of the fastening, in accordance with an example embodiment of the present invention.

FIG. 1 shows a cutaway view of a hydraulic block 1 of a hydraulic assembly of a brake pressure controller of a hydraulic vehicle braking system in the area of a so-called pedal travel simulator. Hydraulic block 1 includes a cylindrical blind hole 2 as a receptacle of a piston 4 of the pedal travel simulator. Instead of the pedal travel simulator, for example, a hydraulic accumulator and/or a damper chamber may also be situated in blind hole 2. The list is by way of example and is not exhaustive. Hydraulic block 1 may also be understood as a housing 3 of the pedal travel simulator, hydraulic accumulator, or the damper chamber and in general as a housing 3. Piston 4 includes a cylindrical extension 5 having a smaller diameter at an end facing toward an orifice of blind hole 2.

Blind hole 2 widens toward the orifice with a ring step to a larger diameter. The ring step forms a depth stop 6 for a cover 7. A larger-diameter section of blind hole 2 between the ring step and the orifice of blind hole 2 forms a depression in hydraulic block 1 and a receptacle 8 for cover 7 in hydraulic block 1, which forms housing 3 of a fastening according to the present invention.

Cover 7 is a cup-shaped, cylindrical hollow body having a closed end and an open end, the open end being located in receptacle 8 of hydraulic block 1 forming housing 3. The closed end of cover 7 protrudes from hydraulic block 1. A disk spring assembly 22 is located in cover 7 as a piston spring, which is supported on the inside on the closed end of cover 7 and acts on piston 4 in blind hole 2.

A punched disk 10, which holds piston 4 in blind hole 2, is situated between an end edge 9 at the open end of cover 7 and the ring step of blind hole 2 forming depth stop 6. Extension 5 of piston 4 protrudes through punched disk 10. End edge 9 at the open end of cover 7 is also referred to here as front end edge 9 or as an end edge 9 of cover 7 in an insertion direction of cover 7 into receptacle 8 of hydraulic block 1 forming housing 3.

Cover 7 externally has a circumferential groove 11 spaced apart somewhat from front end edge 9. The distance of groove 11 from front end edge 9 is a few millimeters or a fraction of a diameter of cover 7.

Receptacle 8 for cover 7 includes an also circumferential groove 12, in an inner circumferential wall 13 opposite to groove 11 of cover 7. Groove 12 in inner circumferential wall 13 of receptacle 8 is offset outward in cover 7 slightly in the direction of depth stop 6 in relation to groove 11, but in such a way that the two grooves 11, 12 overlap one another.

A connecting ring 14 resilient in the radial direction is situated in grooves 11, 12, which engages both inwardly into groove 11 of cover 7 and outwardly into groove 12 in inner circumferential wall 13 of receptacle 8 and thus holds cover 7 in receptacle 8. Connecting ring 14 is a circular ring open at a circumferential point having a circular ring cross section, other open or closed connecting rings being possible. Connecting ring 14 may have a non-circular ring cross section and/or may have a radial corrugation extending in a circumferential direction for the radial resilience (not shown).

As may be seen in particular in the enlargement of FIG. 2, a front groove flank 15 of groove 11 in the insertion direction of cover 7 into receptacle 8 of hydraulic block 1 forming housing 3 of the fastening according to the present invention externally in cover 7 and a front groove flank 16 of groove 12 in the insertion direction in inner circumferential wall 13 of receptacle 8 are truncated cone surfaces, i.e. front groove flanks 15, 16 of grooves 11, 12 of cover 7 and receptacle 8 for cover 7 in the insertion direction extend diagonally from the inside to the outside in the insertion direction. Front groove flank 15 of groove 11 of cover 7 in the insertion direction of cover 7 into receptacle 8 is located on a side of groove 11 close to front end edge 9 at the open end of cover 7. Front groove flank 16 of groove 12 in inner circumferential wall 13 of receptacle 8 is located on a side of groove 12 close to the orifice of receptacle 8. Front groove flanks 15, 16 of grooves 11, 12 are groove flanks 15, 16 at which connecting ring 14 of the fastening according to the present invention is in contact when, for example, an internal pressure in blind hole 2 and in cover 7 acts on cover 7 in the event of separation from receptacle 8.

The truncated cone shape of front groove flank 15 of groove 11 on the outside in cover 7 or the extent of this groove flank 15 sloping from the inside to the outside in the insertion direction of cover 7 into receptacle 8 acts radially outwardly on connecting ring 14 in terms of a widening of connecting ring 14 when cover 7 is acted upon in the event of separation from receptacle 8. In the opposite direction, the truncated cone shape of front groove flank 16 of groove 12 in inner circumferential wall 13 of receptacle 8 or the extent of this groove flank 16 sloping from the inside to the outside in the insertion direction of cover 7 into receptacle 8 acts on connecting ring 14 radially inwardly in terms of a diameter reduction. Due to the action of front groove flanks 15, 16 of grooves 11, 12 of cover 7 in opposition to one another on connecting ring 14 and inner circumferential wall 13 of receptacle 8, connecting ring 14 is held in these two grooves 11, 12 in such a way that it protrudes into both grooves 11, 12 and is in contact both front groove flanks 15, 16 even in the event of high pressure in blind hole 2 and in cover 7, so that cover 7 is held securely in receptacle 8.

The fastening of cover 7 in receptacle 8 of hydraulic block 1 forming housing 3 is inseparable, i.e. cover 7 may only be separated from receptacle 8 by damaging or destroying receptacle 8 and/or cover 7.

Moreover, truncated-cone-shaped front groove flanks 15, 16 extending diagonally from the inside to the outside in the insertion direction of cover 7 into receptacle 8 ensure that front end edge 9 of cover 7 is in contact with punched disk 10 and punched disk 10 is in contact with depth stop 6 of receptacle 8 for cover 7. This means truncated-cone-shaped groove flanks 15, 16 effectuate fastening of cover 7 in receptacle 8 free of axial play even in the event of diameter tolerances of cover 7 in the area of groove 11 and receptacle 8. In the event of a large diameter of cover 7 and/or receptacle 8 due to tolerance, front groove flank 15 of groove 11 of cover 7 widens connecting ring 14, which is resilient in the radial direction, and in the event of a small diameter of cover 7 and/or receptacle 8 due to tolerance, front groove flank 16 of groove 12 in internal circumferential wall 13 of receptacle 8 reduces the diameter of connecting ring 14, so that connecting ring 14 always protrudes into both grooves 11, 12 and front end edge 9 of cover 7 is in contact with punched disk 10 and punched disk 10 is in contact with depth stop 6 in receptacle 8.

Front groove flanks 15, 16 of the two grooves 11, 12 have different slopes, specifically front groove flank 15 of groove 11 on the outside in cover 7 is flatter, i.e. it has a more obtuse cone angle than front groove flank 16 of groove 12 in receptacle 8 for cover 7. The different slopes of front groove flanks 15, 16 of the two grooves 11, 12 are illustrated in FIG. 2 by the two dot-dash jacket lines 23, 24 of front groove flanks 15, 16. Flatter front groove flank 15 of groove 11 on the outside in cover 7 acts outwardly on connecting ring 14 in terms of widening of connecting ring 14. If connecting ring 14 has a circular ring cross section as in the illustrated and described specific embodiment, it may possibly roll on inclined front groove flanks 15, 16 of the two grooves 11, 12; otherwise it slides on front groove flanks 15, 16 or it carries out a combined sliding and rolling movement on front groove flanks 15, 16. During its widening, connecting ring 14 moves outwardly on front groove flank 16 of groove 12 in receptacle 8 for cover 7. Because groove flank 16 is sloping, connecting ring 14 moves axially deeper into receptacle 8 at the same time. Because front groove flank 16 of groove 12 in receptacle 8 is steeper than also sloping front groove flank 15 of groove 11 on the outside in cover 7, connecting ring 14 moves farther axially during its widening in relation to receptacle 8 than in relation to cover 7. This produces a movement of cover 7 deeper into receptacle 8 or forces cover 7 into receptacle 8. A fit of cover 7 without play in the axial direction in receptacle 8 is thus achieved from the outset and with unpressurized blind hole 2.

Groove 12 in receptacle 8 is sufficiently deep that connecting ring 14, in the event of all tolerances of receptacle 8 including its depth stop 6, cover 7 has sufficient radial play outwardly in the area of the fastening and punched disk 10 that it is spread open sufficiently far by an axial action of cover 7 that it presses cover 7 without axial play against punched disk 10 and punched disk 10 against the ring step forming depth stop 6 of receptacle 8.

A pressure action or in general an action in terms of separation of cover 7 from receptacle 8 reinforces the effect: a force acting axially out of receptacle 8 and engaging at cover 7 presses connecting ring 14 via sloping front groove flank 15 of groove 11 on the outside in cover 7 more strongly outwardly and against also sloping front groove flank 16 of groove 12 in receptacle 8, which, because it is steeper, forces cover 7 stronger axially into receptacle 8. The fit of cover 7 free of axial play in receptacle 8 of housing 3 or hydraulic block 1 is ensured at arbitrary pressure.

Cover 7 clamps punched disk 10 without play between its front end edge 9 and the ring step forming depth stop 6. Cover 7 would also be in contact without axial play directly at depth stop 6 in the event of an embodiment of the fastening according to the present invention without punched disk 10 between cover 7 and depth stop 6.

Roundings at transitions of groove flanks 11, 12, 15, 16 to groove bases of the two grooves 11, 12 have a radius at least as large as the ring cross section of connecting ring 14, so that connecting ring 14 is not lifted off of groove flanks 11, 12, 15, 16.

To produce the fastening according to the present invention, cover 7 is moved in the insertion direction, namely axially into receptacle 8 of hydraulic block 1 forming housing 3, until front end edge 9 of cover 7 is in contact with punched disk 10 and punched disk 10 is in contact with depth stop 6 of receptacle 8.

This movement may also be understood as plugging cover 7 into receptacle 8 of housing 3. During the insertion of cover 7 into receptacle 8, connecting ring 14 is located in groove 11 of cover 7. It comes into contact, as is apparent in FIG. 3, with an insertion bevel 17, by which it is compressed until its external diameter is as large as a diameter of inner circumferential wall 13 of receptacle 8, whereby connecting ring 14 may be pushed into receptacle 8. Insertion bevel 17 is a chamfer, i.e., a truncated-cone-shaped surface at a transition from receptacle 8 to an outer surface of hydraulic block 1.

Circumferential groove 11 on the outside in cover 7 is at least as deep as the diameter of the ring cross section of connecting ring 14. If connecting ring 14 has a ring cross section other than a circular ring cross section, groove 11 on the outside in cover 7 is at least as deep as a width of the ring cross section of connecting ring 14 in the radial direction. Connecting ring 14 may thus be completely sunk into groove 11 in cover 7, so that it may be pushed into receptacle 8 in hydraulic block 1 forming housing 3.

It is also possible to situate connecting ring 14 for producing the fastening according to the present invention in groove 12 in inner circumferential wall 13 of receptacle 8. In this event, the insertion bevel is situated at front end edge 9 of cover 7 and groove 12 in inner circumferential wall 13 of receptacle 8 is at least as deep as the diameter or the width of the ring cross section of connecting ring 14 (not shown), so that the insertion bevel of cover 7 in this event presses connecting ring 14 into groove 12 in inner circumferential wall 13 of receptacle 8 and cover 7 may be pushed into connecting ring 14 in groove 12 in inner circumferential wall 13 of receptacle 8.

If grooves 11, 12 of cover 7 and receptacle 8 reach one another during the insertion of cover 7 into receptacle 8, connecting ring 14 springs back, so that it protrudes into both grooves 11, 12 and fastens cover 7 in receptacle 8 and thus connects it to hydraulic block 1 forming housing 3.

A rear groove flank 18 of groove 11 of cover 7 in the insertion direction is a radial surface, i.e. it extends perpendicularly to the insertion direction, so that during the insertion of cover 7 into receptacle 8, it pushes connecting ring 14 into receptacle 8. A rear groove flank 19 of groove 12 in the insertion direction in inner circumferential wall 13 of receptacle 8 is also a radial surface extending perpendicularly to the insertion direction.

Figure 4:
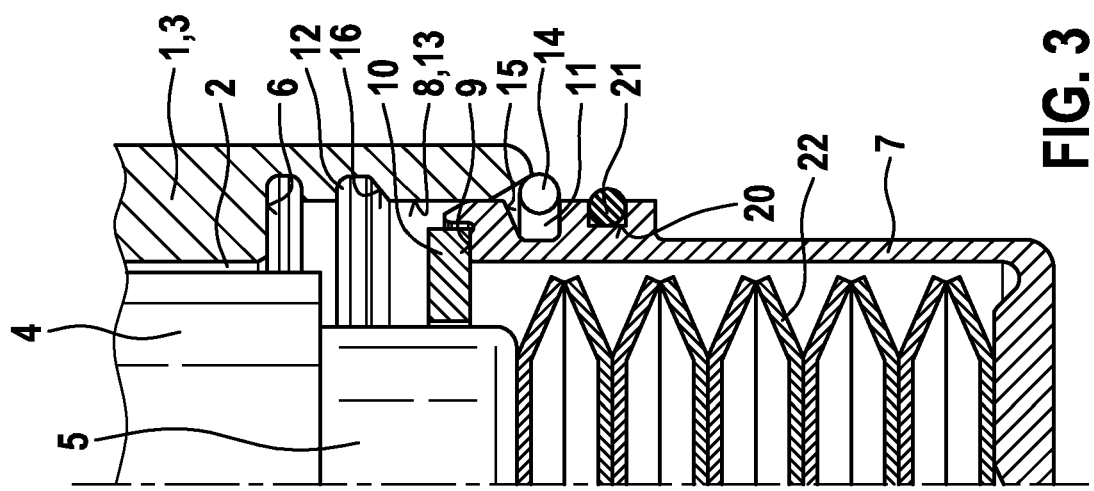

On a side of groove 11 facing away from front end edge 9 of cover 7, cover 7 has a further circumferential groove on the outside, which is referred to here as a seal groove 20. A seal ring 21 is situated in seal groove 20, which seals off hydraulic block 1 forming housing 3 between cover 7 and receptacle 8. In the illustrated and described specific embodiment, seal ring 21 is an O-ring, however other seal rings such as a quad-ring or a ring having square or rectangular ring cross sections may also be used. As is apparent in FIG. 4, seal ring 21 is pressed into seal groove 20 by insertion bevel 17 during the insertion of cover 7 into receptacle 8, so that it comes into sealing contact on inner circumferential wall 13 of receptacle 8.

Inner circumferential wall 13 of receptacle 8 is cylindrical and coaxial in relation to blind hole 2 in hydraulic block 1 and in relation to cover 7. Inner circumferential wall 13 thus extends in the insertion direction of cover 7 into receptacle 8.

Hydraulic block 1 is a cuboid metal block made of an aluminum alloy, a production from metal not being required for the present invention. Hydraulic block 1 is used for mechanical fastening and hydraulic interconnection of components of the brake pressure controller of the hydraulic vehicle braking system (not shown). The brake pressure controller may be a controller of a hydraulic brake pressure including the generation of the hydraulic brake pressure in the event of a power braking system and/or a traction slip controller, wheel brake pressures preferably being controlled individually in hydraulic wheel brakes for the traction slip controller.

Traction slip controllers are an antilock braking system, a traction control system, and a vehicle dynamics system, which is also referred to as an electronic stability program and colloquially often also as an anti-slip device. The abbreviations ABS, ASR, FDR, and ESP are conventional for these traction slip controllers. Such brake pressure controllers are conventional and are not explained further here.

Hydraulic components of the brake pressure controller are, inter alia, solenoid valves, check valves, hydraulic pumps, hydraulic accumulators, damper chambers, pedal travel simulators, and pressure sensors. The list is not necessarily complete. When equipped with components, the hydraulic block forms a hydraulic assembly of the brake pressure controller of the hydraulic vehicle braking system (otherwise not shown).

"Hydraulic interconnection" means a hydraulic connection of the components corresponding to a hydraulic circuit diagram of the brake pressure controller.

Figure 5:
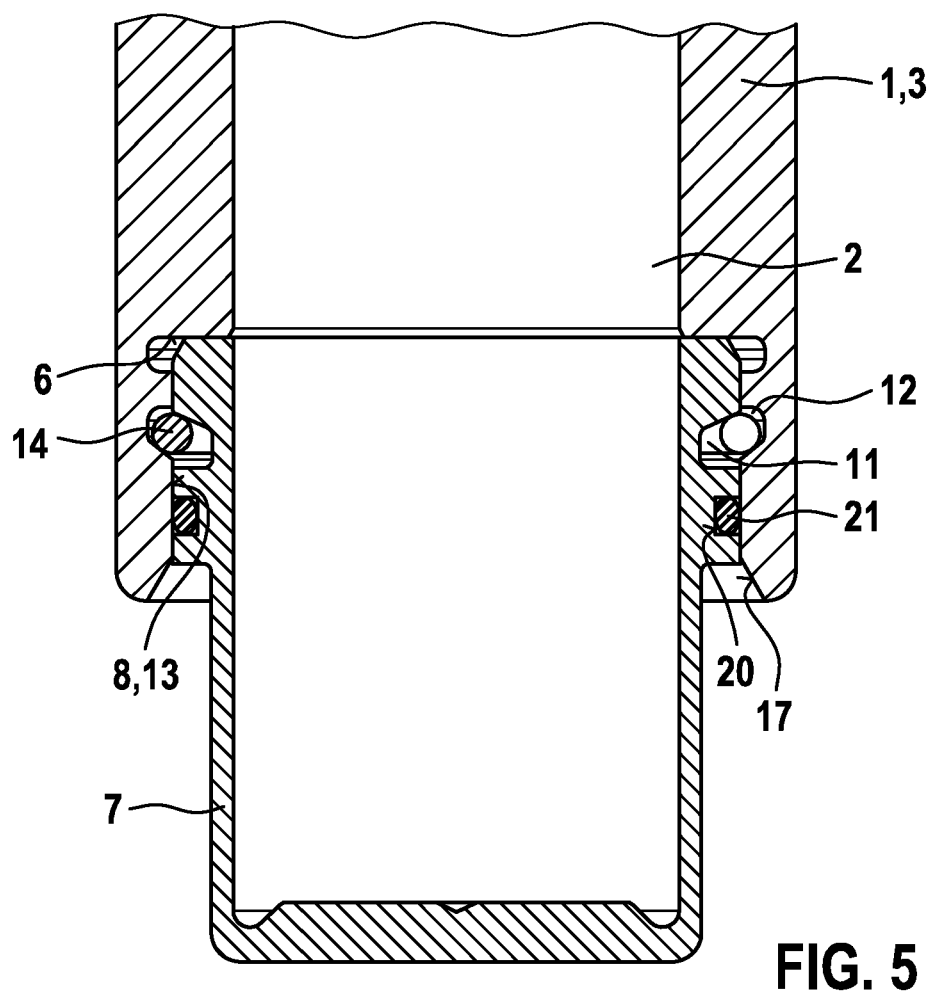
FIG. 5 shows an axial section of a second specific embodiment of a fastening according to an example embodiment of the present invention.

The fastening according to the present invention is possible not only for cover 7 of the pedal travel simulator, but rather basically enables the fastening of any cover 7 or a component in general in receptacle 7 of hydraulic block 1, housing 3, or any other component in general. FIG. 5 shows an axial section corresponding to FIG. 1 of a specific embodiment of the present invention without piston 4, punched disk 10, and disk spring assembly 22. Cover 7 is fastened using connecting ring 14 in receptacle 8 of housing 3 or hydraulic block 1 as explained above with respect to FIGS. 1 and 2. Cover 7 is not mechanically acted on in this embodiment of the present invention by disk spring assembly 22 or upon contact of piston 4 on punched disk 10 mechanically by punched disk 10, but rather is hydraulically acted upon by a hydraulic pressure prevailing in blind hole 2, which cover 7 closes, and in cover 7.

Connecting ring 14 holds cover 7, as explained with respect to FIGS. 1 and 2, against the hydraulic pressure prevailing therein axially without play in receptacle 8 of hydraulic block 1 forming housing 3.

End edge 9 at the open end of cover 7 from FIG. 5 does not have a ring step for punched disk 10, which is not provided in FIG. 5, but end edge 9 of cover 7 is in contact directly with the ring step forming depth stop 6 in receptacle 8 for cover 7. As explained, connecting ring 14 presses upon hydraulic pressure application of cover 7 from the inside, cover 7 without axial play with end edge 9 against the ring step forming depth stop 6 in receptacle 8.

What is claimed is:
1. A device comprising:
a cover;
a housing that includes a receptacle into which the cover is inserted axially in an insertion direction; and
a connecting ring;
wherein:
  a first circumferential groove is formed in an outer circumferential wall of the cover;
  a second circumferential groove is formed in an inner circumferential wall of the receptacle each have a circumferential groove;
  the connecting ring is resilient in a radial direction and is arranged partly within each of the first and second circumferential grooves, protruding inwardly into the first circumferential groove and outwardly into the second circumferential groove, thereby connecting the cover to the housing;
  the first circumferential groove includes a first sloping circumferential groove wall having a radially outward extending cross-section that extends radially outward from a central longitudinal axis of the device and an axially extending surface;
  the second circumferential groove includes a second sloping circumferential groove wall having a radially outward extending cross-section that extends radially outward from the central longitudinal axis of the device and an axially extending surface; and
  the device further includes at least one of the following two features (a) and (b):
    (a) the respective axially extending surfaces of the first and second sloping circumferential groove walls face each other, and the slopes of the first and second sloping circumferential groove walls are such that their cross-sectional radially outward extensions occur with a same axial direction of extensions of their axially extending surfaces; and
    (b) the slope of the second sloping circumferential groove wall, which is of the inner circumferential wall of the receptacle, is steeper than the slope of the first sloping circumferential groove wall, which is of the outer circumferential wall of the cover.

2. The device as recited in claim 1, wherein the receptacle of the housing for the cover includes a depth stop, which limits an insertion depth of the cover into the receptacle of the housing.

3. The device as recited in claim 2, wherein the receptacle of the housing has a step protruding inwardly from the inner circumferential wall as the depth stop for the cover.

4. The device as recited in claim 1, wherein the connecting ring resilient in the radial direction is open at a circumferential point and/or has a round ring cross section.

5. The device as recited in claim 1, wherein the cover on the outside and/or the receptacle of the housing includes a seal groove in which a seal ring is situated.

6. The fastening device as recited in claim 1, wherein the first circumferential groove on the outside at the cover is at least as deep as a ring cross section of the connecting ring is wide in the radial direction, so that the connecting ring may be entirely sunk in the first circumferential groove on the outside at the cover.

7. The device as recited in claim 1, wherein the cover includes, at a transition from a front end edge of the cover in the insertion direction to an outer circumference of the cover a first insertion bevel, which, during insertion of the cover into the receptacle of the housing, presses the connecting ring into the second circumferential groove in the inner circumferential wall of the receptacle.

8. The fastening as recited in claim 7, wherein the receptacle of the housing for the cover includes, at an orifice of the receptacle via which the cover is inserted into the receptacle, a second insertion bevel.

9. The device as recited in claim 1, wherein the housing is a hydraulic block of a brake pressure controller of a hydraulic vehicle braking system.

10. The device as recited in claim 1, wherein the respective axially extending surfaces of the first and second sloping circumferential groove walls face each other, and the slopes of the first and second sloping circumferential groove walls are such that their cross-sectional radially outward extensions occur with the same axial direction of extensions of their axially extending surfaces.

11. The device as recited in claim 10, wherein the same axial direction is the insertion direction.

12. The device as recited in claim 1, wherein the slope of the second sloping circumferential groove wall, which is of the inner circumferential wall of the receptacle, is steeper than the slope of the first sloping circumferential groove wall, which is of the outer circumferential wall of the cover.

13. The device as recited in claim 12, wherein the second sloping circumferential groove wall extends radially outward as the axially extending surface of the second sloping circumferential groove wall extends axially in the insertion direction.

14. The device as recited in claim 1, wherein the second circumferential groove includes another groove wall that faces the second sloping circumferential groove wall and that is more distal than the second sloping circumferential groove wall to a terminal end of the receptacle into which the cover is inserted into the receptacle.

15. The device as recited in claim 14, wherein the cover protrudes out of the receptacle at the terminal end of the receptacle.

16. The device as recited in claim 1, wherein the first circumferential groove includes another groove wall that faces the first sloping circumferential groove wall and that is more distal than the first sloping circumferential groove to a terminal end of the cover that is in the receptacle.

17. The device as recited in claim 16, wherein the cover protrudes out of the receptacle so that an end of the cover opposite to the terminal end that is in the receptacle is positioned outside of the receptacle.

18. The device as recited in claim 1, wherein the second circumferential groove includes another groove wall that faces the second sloping circumferential groove wall and that extends perpendicularly to the insertion direction.

19. The device as recited in claim 1, wherein the first circumferential groove includes another groove wall that faces the first sloping circumferential groove wall and that extends perpendicularly to the insertion direction.

20. The device as recited in claim 1, wherein:
   the first circumferential groove includes another groove wall that faces the first sloping circumferential groove wall and that extends perpendicularly to the insertion direction; and
   the second circumferential groove includes another groove wall that faces the second sloping circumferential groove wall and that extends perpendicularly to the insertion direction.

21. The device as recited in claim 1, wherein:
   the first circumferential groove includes a groove floor between the first sloping circumferential groove wall and another groove wall of the first circumferential groove; and
   the second circumferential groove includes a groove floor between the second sloping circumferential groove wall and another groove wall of the second circumferential groove.

* * * * *